US010864932B2

(12) United States Patent
Darvish (10) Patent No.: US 10,864,932 B2
(45) Date of Patent: Dec. 15, 2020

(54) FOLDABLE CART WITH DEPLOYABLE WHEELS

(71) Applicant: Daniel Darvish, Chatsworth, CA (US)

(72) Inventor: Daniel Darvish, Chatsworth, CA (US)

( * ) Notice: Subject to any disclaimer, the term of this patent is extended or adjusted under 35 U.S.C. 154(b) by 0 days.

(21) Appl. No.: 16/250,567

(22) Filed: Jan. 17, 2019

(65) Prior Publication Data

US 2020/0239054 A1    Jul. 30, 2020

(51) Int. Cl.
     *B62B 3/02*            (2006.01)

(52) U.S. Cl.
     CPC .................................. *B62B 3/027* (2013.01)

(58) Field of Classification Search
     CPC ............ B62B 2205/12; B62B 2205/33; B62B 2206/006; B62B 3/02
     See application file for complete search history.

(56) References Cited

U.S. PATENT DOCUMENTS

| | | | | | |
|---|---|---|---|---|---|
| 4,993,727 | A | * | 2/1991 | vom Braucke | B62B 1/12 280/40 |
| 5,348,325 | A | * | 9/1994 | Abrams | B62B 1/12 280/40 |
| 5,630,601 | A | * | 5/1997 | vom Braucke | B62B 1/12 280/40 |
| 5,803,471 | A | * | 9/1998 | DeMars | B62B 1/125 280/40 |
| 5,984,327 | A | * | 11/1999 | Hsieh | A45C 13/385 280/38 |
| 6,053,514 | A | * | 4/2000 | Su | B62B 1/12 280/40 |
| 7,097,183 | B1 | * | 8/2006 | Su | B62B 1/12 280/40 |
| 7,140,635 | B2 | * | 11/2006 | Johnson | B62B 1/12 280/646 |
| 7,387,306 | B2 | * | 6/2008 | Zimmer | B62B 1/125 280/40 |
| 7,441,785 | B1 | * | 10/2008 | Tsai | B62B 1/12 280/47.29 |
| 8,936,259 | B2 | * | 1/2015 | Tsai | B62B 1/12 280/40 |
| 10,392,041 | B1 | * | 8/2019 | Khodor | B62B 1/12 |
| 2002/0180184 | A1 | * | 12/2002 | Chang | B62B 1/125 280/652 |
| 2004/0150195 | A1 | * | 8/2004 | Robberson | B62B 1/12 280/652 |

(Continued)

*Primary Examiner* — Bryan A Evans
(74) *Attorney, Agent, or Firm* — Rahman LLC (57) ABSTRACT

A foldable cart includes a handle portion, a foldable frame movably connected to the handle, and one or more wheels for rolling on a surface. In an unfolded (in-use or open) condition, the foldable frame constructs a holding-space defining a receiving cavity therein for carrying items, and the action of unfolding the frame automatically deploys wheels to enable immediate use of the cart by the end-user or customer. In a folded (storage or closed) condition, the carts' frame folds to occupy a smaller space in one or more spatial dimensions, and the automatically deployed wheels turn to occupy smaller total space in one or more spatial dimensions. In the folded condition, the cart is easy to store in a small space (e.g. in a small closet, under a bed, etc.) or transport (e.g. in the trunk of an automobile, vehicle, airplane, train, ship with a courier, etc.).

20 Claims, 10 Drawing Sheets

(56) References Cited

U.S. PATENT DOCUMENTS

| | | | |
|---|---|---|---|
| 2010/0253025 A1* | 10/2010 | Smith | B62B 1/12 280/47.27 |
| 2011/0285113 A1* | 11/2011 | Su | B62B 1/12 280/654 |
| 2013/0049333 A1* | 2/2013 | Yang | B62B 1/12 280/652 |
| 2013/0147163 A1* | 6/2013 | Chang | B62B 1/12 280/652 |
| 2017/0096155 A1* | 4/2017 | Gibson | B62B 1/12 |

* cited by examiner

FOLDABLE CART WITH DEPLOYABLE WHEELS

FIELD AND SUMMARY OF THE INVENTION

The present invention relates to a portable cart, for example a shopping cart, adapted to be shipped or stored in a flat position. The cart is adapted to easily fold between a folded condition (collapsed, closed, or storage position) and an unfolded condition (open or in-use position), so that the cart is convenient and easy for storage and for usage. The cart wheel automatically deploys from folded condition to unfolded condition. The cart requires minimal or no assembly by the end-user. The wheels automatically deploy when the cart is unfolded (in-use).

DESCRIPTION OF THE RELATED ART

Customers often use a cart with wheels to carry a variety of goods, including but not limited to food and produce items, home and garden items, office products, picnic or outings items, sports goods, or clothing and laundry items.

A preferred or best-mode example of such cart is a "shopping cart". Stores or markets (e.g. vendors, sellers, supermarkets, etc.) often provide their customers with shopping carts for facilitating the shopping experience, including transportation and purchase of goods. The end-user customers or consumers can temporarily store goods in the shopping carts before payment at the store check-out counter, and carry their purchased goods from the store to their vehicles in the parking lot. Such shopping carts enable the customers to temporarily carry goods or items during shopping and after, including transportation to vehicle and to their homes. Some stores' carts have security provisions to prevent the cart leaving the store, or otherwise limit the carts' distance from the store. Therefore, many customers prefer to use their own personal carts to enable them to: 1) Carry the goods from home to stores or markets, 2) Avoid unclean or poor functioning carts, 3) Always have a cart available.

A typical cart comprises a handle for the end-user to grip thereon, a frame providing support for a holding-space (e.g. container, basket, or bag) defining a receiving cavity for carrying goods or items therein, and one or more wheels mounted to the frame for rolling on a ground surface so that the cart is convenient for pulling or pushing forward, backward, or sideways. Accordingly, the basket or holding-space should be large enough to be useful, depending on the specific needs of the end-user or owner of the cart. Often, the shopping carts provided by stores are heavy, bulky and difficult to maneuver. Moreover, the store has to make special room or space for the storage of these shopping carts, and therefore the majority of stores use stackable carts to reduce the storage room or space needed for the bulky carts. Such shopping carts are not suitable for personal use because they cannot be easily transported between home and store, and cannot easily fit in a small automobile, vehicle, closet, under bed, etc.

Recently, stores also encourage customers to bring their own carts (i.e. baskets, bags, or shopping cart with or without wheels) for shopping. Many stores have started charging for plastic or paper bags due to environmental protection, energy saving, and cost concerns. For some customers, such as many seniors or disabled individuals, it is a great burden to hand carry the shopping goods using baskets or bags, and carts with wheels are easier to use for such customers. A customer using an appropriately-sized wheeled cart can easily carry several shopping bags full of goods. Thus, when buying more than one small bag of items, a wheeled shopping cart is preferred.

Particularly, with the help of a wheeled shopping cart, senior or disabled consumers would not need to carry the heavy goods by hand. A shopping cart functions as a tool for carrying items, but currently available conventional shopping carts are not convenient for storage in the closet or in small vehicle. In other words, the conventional shopping cart is only suitable for use within, or in proximity to, the store or market.

Similar portable foldable or folding shopping carts currently available on the market, which can fit in a small closet or a small automobile or vehicle, require the end-user customer to assemble the cart and/or cart wheel(s) first before the cart can be used. Furthermore, when the cart is assembled, the wheel or wheel-bracket on these carts do not collapse or fold in closed position, and the fully assembled cart wheels occupy extra space when the cart is folded. Also, when the folded cart is placed against a wall or flat surface, the wheels roll and the cart falls to the ground. These carts are usually shipped from factory with the wheels unassembled to reduce packaging size and expense, for they occupy a smaller space in shipping containers or trucks.

Therefore, a portable and foldable cart, which has a light weight and is collapsible or foldable to a compact size to fit in a small vehicle or a small closet when not in-use, is highly desired by the consumers for shopping or other purposes.

In Asia, the many shopping carts, or parts of the cart frame or holding-space or handle, are made of plastic material to reduce weight. However, compared to metal carts, the plastic carts are prone to cracking or breaking, and may fail to provide reliable long term support if used every day. The chance of damage is higher when the cart is used to carry heavier goods or items.

SUMMARY OF THE PRESENT INVENTION

The current invention describes a cart that requires minimal or no assembly by the end-user customer before using the cart. This is accomplished by automatically deploying the cart wheel or wheels from a folded (closed) position to an unfolded (open or in-use) position. Thus, the present invention allows the wheel or wheels to be deployed to their working (in-use) position when the cart is in-use or in operation by the end-user.

The main object of the present invention is to provide a cart adapted to fold (closed, for storage) and unfold (opened, for usage or in-use position), so that the cart is easy for using and for storage. When the cart is folded, it can be stored in a smaller space, or packaged and shipped by mail, courier, or trucking company, without having to un-assemble the wheels. In fully assembled folded/closed condition, the cart occupies a similar small space as other currently available carts occupy in un-assembled condition (packaged to be shipped by factory to store or to customer or to end-user). To use the currently available carts on the market, the end-user has to assemble the cart, or at least affix or connect the cart wheel or wheels to the cart, before the end-user can use the cart for carrying goods or items. This invention allows the factory to ship the cart pre-assembled in folded condition, and the end-user does not have to assemble the cart or the wheels before using the cart for carrying the goods or items. The foregoing are examples of some of the advantages provided by the present invention.

Another object of the present invention is to provide a foldable shopping cart which has a simple, rigid and strong structure, with lower manufacturing cost, to make it affordable for all end-user customers and consumers. The foregoing are examples of some of the advantages provided by the present invention.

A preferred or best mode embodiment of the present invention is to provide a foldable cart, wherein the cart wheels automatically deploy to in-use position when the cart is unfolded by the end-user. When the shopping cart is in the unfolded in-use position, the foldable frame defines a holding-space for receiving items, and when the shopping cart is in the folded storage position, the foldable frame is folded to a smaller dimension so that the cart is convenient for storage and transportation. The foregoing are examples of some of the advantages provided by the present invention.

Another embodiment of the present invention is to provide a foldable cart, wherein a handle is connected to a foldable frame, and wherein a base frame is connected to the foldable frame, wherein the base frame comprises a front support bar and a rear support bar. The front support bar is movably coupled with the handle and the foldable frame, wherein when the shopping cart is in the unfolded condition, the front bar serves as a support for the holding-space basket constructed by the foldable frame so that the shopping cart is capable of supporting a heavy load/weight. The foregoing are examples of some of the advantages provided by the present invention.

Another embodiment of the present invention is to provide a foldable cart, wherein the foldable frame comprises a front frame, a rear frame, two side frames, and/or a base panel to construct a holding-space defining a receiving cavity or basket therein, the base panel is movably connected to one of the supporting frames so that when the foldable frame defines the holding-space in the unfolded condition, a support bar supports the base panel so that the weight of goods or items rest on, or are supported by, the base panel.

Another embodiment of the present invention is a foldable cart, wherein the length of the front support bar is relatively shorter than the rear support bar of the base frame, so that when the shopping cart is in the folded storage position, the base panel and the front frame of the foldable frame are overlapped, folded with the rear frame.

In the primary or preferred best mode embodiment of the present invention, one or more wheels are deployed to their working, operational, or in-use position, when the cart is opened (from folded to unfolded condition). In folded condition, the cart occupies flat space, providing additional storage space (e.g. in a closet or in a vehicle) to the end-user. The cart folds to significantly smaller dimensions. The wheels automatically fold, or collapse to a more compact position, upon folding of the cart, leading to less total space being used by the folded cart. The foregoing are examples of significant or critical advantages provided by the present invention.

In other embodiments of the invention, the automatically deploying wheel or wheels are front, back, or side wheel or wheels.

In the preferred embodiments of the invention, the movement (collapsing, pivoting, folding, etc.) of the automatically deploying wheel or wheels are controlled to allow for smooth folding and unfolding of the cart. The means of control adjusts the timing, angle, pressure and/or movement of the automatically deploying wheels to avoid interference with the folding and unfolding of the cart. Wheels may lock and unlock with a switch, lever, kick, tap, shake, etc. Such lock-unlock mechanism may either affect the wheel collapsing or the wheel turning/rolling or both.

In preferred embodiments of the invention, the automatically deploying wheel or wheels are spring loaded, wherein the spring is at minimum or least allowable tension (most relaxed) when the cart is in the folded storage or collapsed position. The wheel spring is at maximum or most allowable tension (highest tension) when the cart is in the unfolded in-use open position. It is critical that that there exists a device or instrument as means to translate the folding and collapsing motion of the cart to rotational or collapsing motion of the automatically deployed wheel. It is not critical that mechanisms of the folding, unfolding, or wheel deployment is spring loaded. In the present invention, the example components that are critical to such device or instrument are disclosed in the figures.

In preferred embodiments of the invention, the automatically deploying wheel or wheels move closer to the cart in one, two, or all three spatial dimensions. In the folded storage or closed position, the cart will use the least amount of total space (in at least one spatial dimension) when the automatically deploying wheel moves closer to the cart in collapsed position. The wheel moves closer to the cart in one or more spatial dimensions. In the present example drawings disclosed in the figures, the wheels automatically move closer (rotate and lift upward) to the cart when the cart is in folded, collapsed, or closed position; the wheels automatically deploy and move lower when the cart is in unfolded, open, or in-use position. The foregoing are examples of significant and critical advantages provided by the present invention.

To enable the automatically deploying wheel in the preferred embodiment, a mechanism to convert between linear and rotational motion is needed. Examples of such mechanisms include crankshaft, Scotch Yoke, cam-shaft, cam-lever, wobble drive (a.k.a nutator or Z-crank), or swashplate. The mechanism used for a preferred embodiment describe in the drawings most closely resembles the cam and lever.

In preferred embodiments of the invention, the cam, the cap, and the wheel-bracket responsible for the automatically deploying wheel are made of a durable metal, plastic, or synthetic materials that are resistant to damage (e.g. breaking, rusting, bending, loosening, warping, or other fatigue, wear, and degradation) caused or hastened by: (1) pressure from the mechanism, (2) pressure from weight/use of the device, (3) repetitive turning or pivoting motion, and (4) exposure to natural or unnatural elements such as heat, light, humidity, oils, some other chemicals commonly found in residential and commercial environments. The foregoing are examples of significant or critical advantages provided by the present invention.

In other embodiments, the wheel or wheels may be deployed manually, requiring the end-user to unfold, shift, swing, slide, or rotate the wheels independently from folding and unfolding the cart.

In other embodiments, the cart frame, handle, wheel-bracket, or parts thereof, may be moved closer to the folded cart in one or more spatial dimensions by using mechanical engineering mechanisms such as telescoping, cam-lever, folding, collapsing, bending of a flexible material, lock-unlock, and/or rotating.

The embodiments of this invention, comprising a foldable cart with deployable wheels, are used to carry a variety of goods, including but not limited to food and produce items, home and garden items, office products, picnic or outings items, sports goods, or clothing and laundry items. Such cart is used to carry any item that fits within the holding-space (e.g. basket, bag, cavity, etc.) of the cart.

BRIEF DESCRIPTION OF THE DRAWINGS

The illustrative embodiment may be described with reference to the accompanying figures as follows.

DETAILED DESCRIPTION OF THE PREFERRED EMBODIMENT

In the following detailed description reference is made to the accompanying drawings which form a part hereof, and is shown by way of illustration specific embodiments in which the invention can be reduced to practice. In this regard, directional terminology, such as "front", "rear", "side", "left", "right", "top", "bottom" etc., is used with reference to the orientation of the figures being described. Because components of embodiments of the present invention can be positioned in a number of different orientations, the directional terminology is used for purposes of illustration and must not be construed as a limitation of present invention.

Referring to FIG. 1 through FIG. 9 of the drawings, a foldable cart with deployable wheels (100) according to a preferred embodiment of the present invention is illustrated, wherein the foldable cart comprises a handle (10, 11), a foldable frame (12-17) movably connected to the handle (10), a base frame (15, 16) supporting the foldable frame, and a plurality of wheels (100, 200) provided at a rear frame (16, 17) adapted for rolling on a surface.

Figure 1:
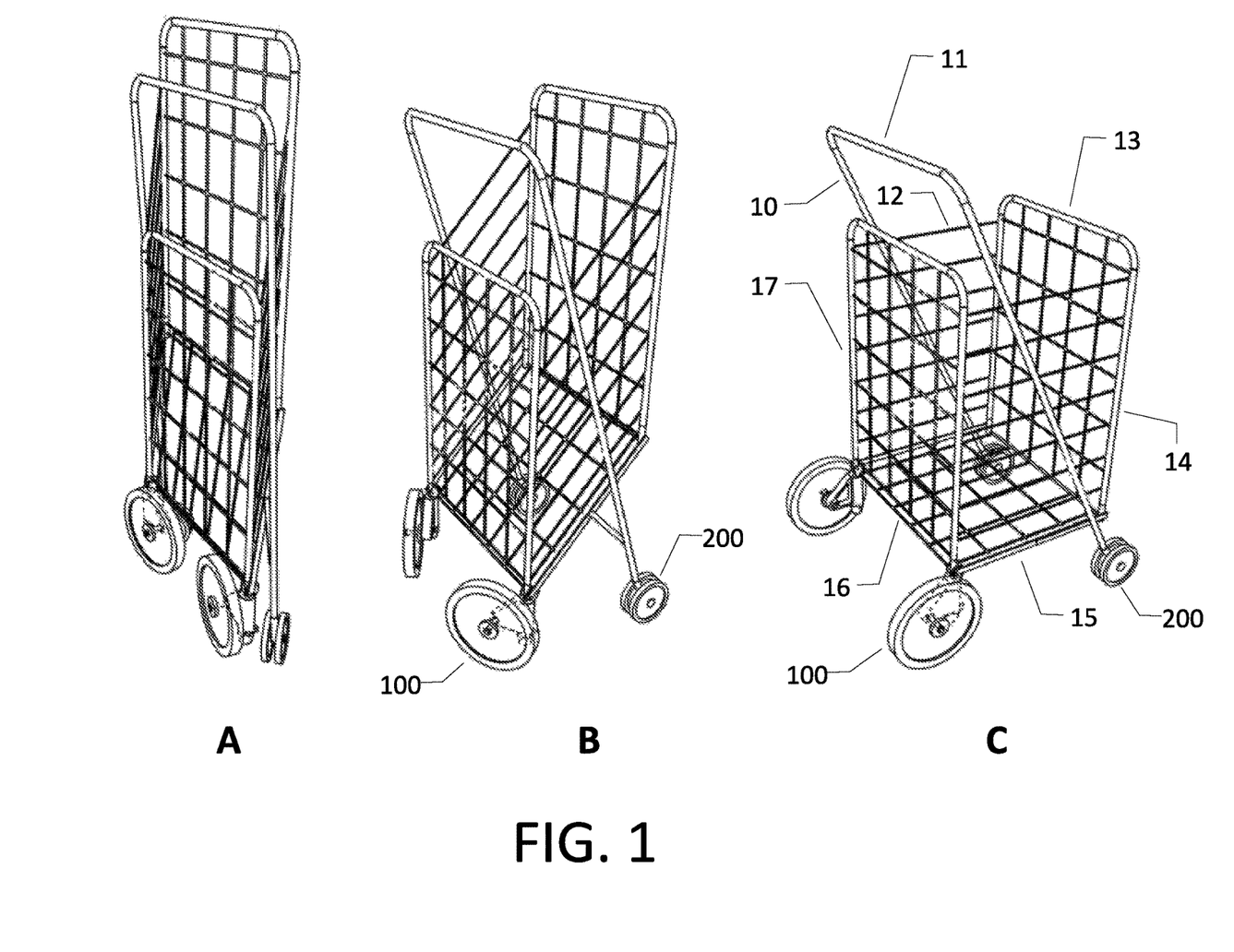
FIG. 1 Shows three dimensional perspective views of a foldable shopping cart in: A) Folded or closed condition, B) Partially unfolded condition, and C) Fully unfolded or open condition.

Continuing with FIG. 1 of the drawing, the cart is shown in folded condition (FIG. 1A), partially unfolded condition (FIG. 1B), and fully unfolded condition (FIG. 1C). The wheels are approximately parallel to the folded cart in FIG. 1A, and approximately perpendicular to the back frame of the cart (same two dimensional spatial frame of the folded cart) in the fully unfolded open condition (FIG. 1C). When the cart is in folded condition (FIG. 1A), the wheel or wheels may be inactivated or locked. In this folded condition, the cart can more readily be rolled into a closet, between cabinets, etc. The deployable wheel may be inactivated either automatically when the end-user folds the cart, or inactivated manually by the end-user by manually turning or collapsing the wheel or using another mechanism such as lock-unlock pin or lever or latch.

As shown in FIG. 1C, the handle comprises a hand gripping portion (11) and two handle-side portions (10) extended from the hand gripping portion. Accordingly, the foldable frame 20 is mounted between the two handle-side portions (10). The hand gripping portion (11) is adapted for user's hands to hold thereon so that the user can pull, push, or turn the shopping cart by operating the handle.

The handle may be made from an integral elongated metal piece, wherein the hand gripping portion might be provided with a cover element (11), which can be embodied as a fabric layer, foam layer, or a plastic layer, wrapping around the hand gripping portion (11) for enhancing the visual look and/or enhancing the frictional contact and feel between a user's hand and the hand gripping portion (11).

The foldable frame (12-17) is adapted to fold between a folded collapsed condition or position (FIG. 1A) and an unfolded in-use condition (FIG. 1C). Accordingly, the foldable frame constructs a basket defining a holding-space or receiving cavity therein for carrying items in the unfolded open condition (FIG. 1C). The cart folds flat to occupy a smaller space suitable for storing in the closet, or the trunk of a vehicle, or other small space, either vertically or horizontally (FIG. 1A).

The base frame (15, 16) serves as a base for supporting the foldable frame, and items and goods within the holding-space when the foldable frame is in the unfolded condition (FIG. 1C).

The front frame (13, 14) and the rear frame (16, 17) can be embodied based on metal, wood, plastic, or synthetic materials. In this preferred embodiment, the cart frame is metal. The end-user can fold and unfold this cart by placing one hand on the handle (11) and another hand on the front frame (13) and lifting and pulling the cart together (FIGS. 1 C, B, A). In other words, the front frame (13) and the handle (11) move closer together or apart, which causes the wheels to automatically collapse or deploy with the folding and unfolding of the cart.

Furthermore, the front frame (13, 14) comprises a plurality of horizontal and vertical ribs, spaced within the frame between the front upper top-front frame (13) and side-front frames (14). The front wheels may be mounted either at the bottom of the handle-side frames (10), or at the bottom of the front frames (14), or on the base frames (15). Correspondingly, the rear frame (16, 17) comprises a plurality of horizontal and vertical ribs, spaced within the frame between the back frames (16, 17). The rare wheels may be mounted either at the bottom portion of the rare or back frames (17), at the base frames (15, 16), or at the ribs (or plate supported by the ribs) connected to the base frames (15, 16).

The ribs may not be strictly extended horizontally and vertically, in other words, the ribs can be extended in an inclined manner between the cart frame, so that the mesh pattern formed by the ribs can be varied. In other embodiments there is no need for the ribs of any form or type (e.g. the cart may have a fabric liner or bag that defines a holding-space).

Each of the front and back side-frames (14, 17) comprise connections to side-ribs (12), having two ends movably connected to the front and back side-frames.

Figure 2:
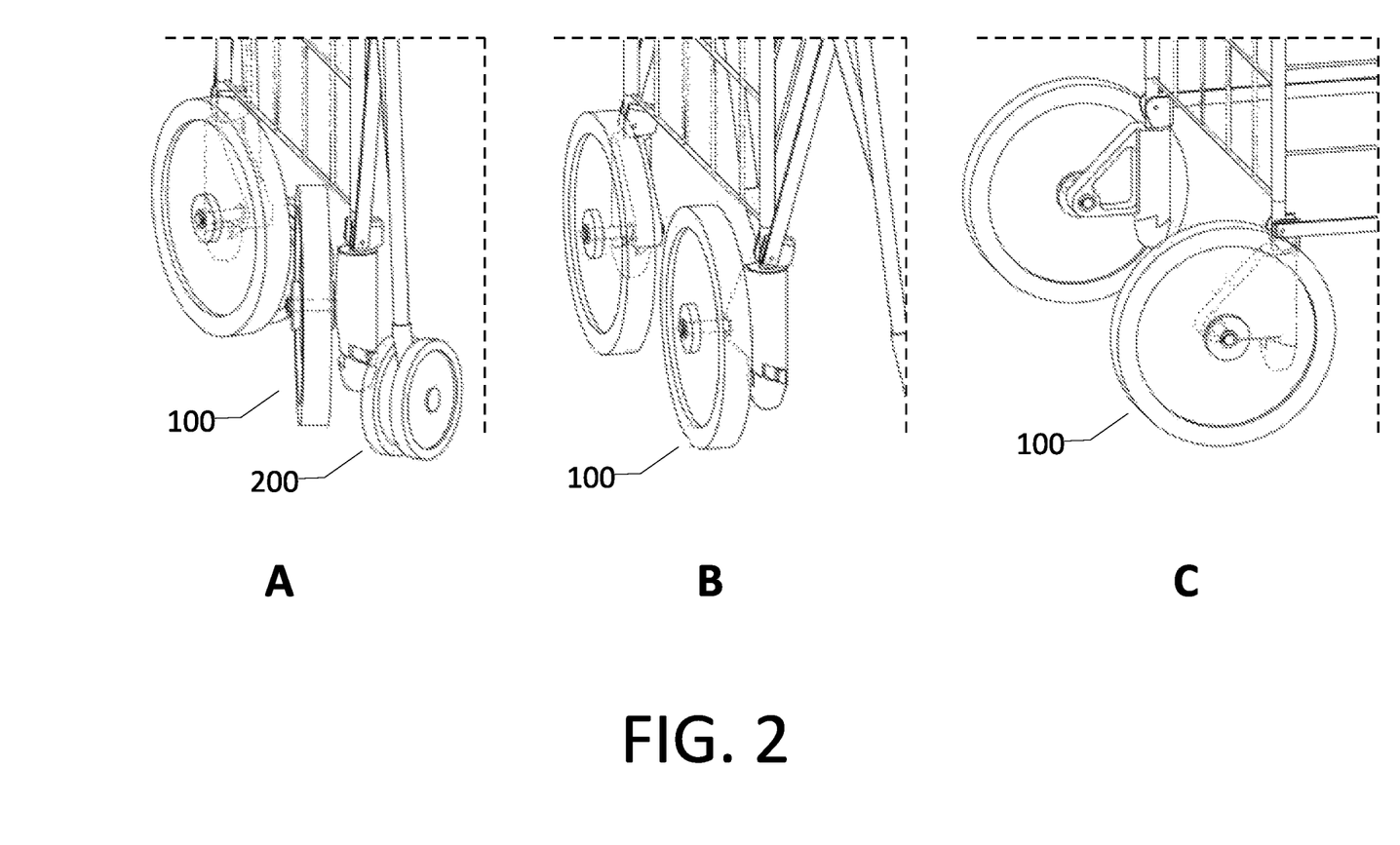
FIG. 2 Shows three dimensional perspective views of the rear or back wheels of the foldable shopping cart in: A) Folded or closed condition, B) Partially unfolded condition, and C) Fully unfolded or open condition.

FIG. 2 shows that upon unfolding the cart, the rear wheels (100) automatically deploy from folded (FIG. 2A), to partially unfolded (FIG. 2B), and to fully unfolded (FIG. 2C) positions. The wheel, when in closed folded condition, is parallel to the two dimensional spatial plane of the collapsed or closed cart (FIG. 1A). The wheel, when in open unfolded condition, is almost or approximately perpendicular to the two dimensional spatial plane of the back frame (FIG. 1C: 16 and 17) of the open cart. In other words, the wheel collapses from a perpendicular (in-use or open) position to a parallel (closed, collapsed, or compact) position. In preferred embodiments, the deploying wheels collapse to fold behind the foldable cart. In other embodiments, the deploying wheels may collapse to fold in front or underneath the foldable cart.

In other embodiments, the wheels may be mounted on a mandrel, axle, rod, or shaft, which helps to support the wheels and/or the weight of the cart. When two or more wheels are connected to the same mandrel, axle, rod, or shaft, it helps to further support the wheels and/or the weight of the cart In other embodiments the wheel or wheel-bracket may be mounted directly on a frame of the cart, thereby reducing the number of parts needed in the manufacturing process.

Figure 3:
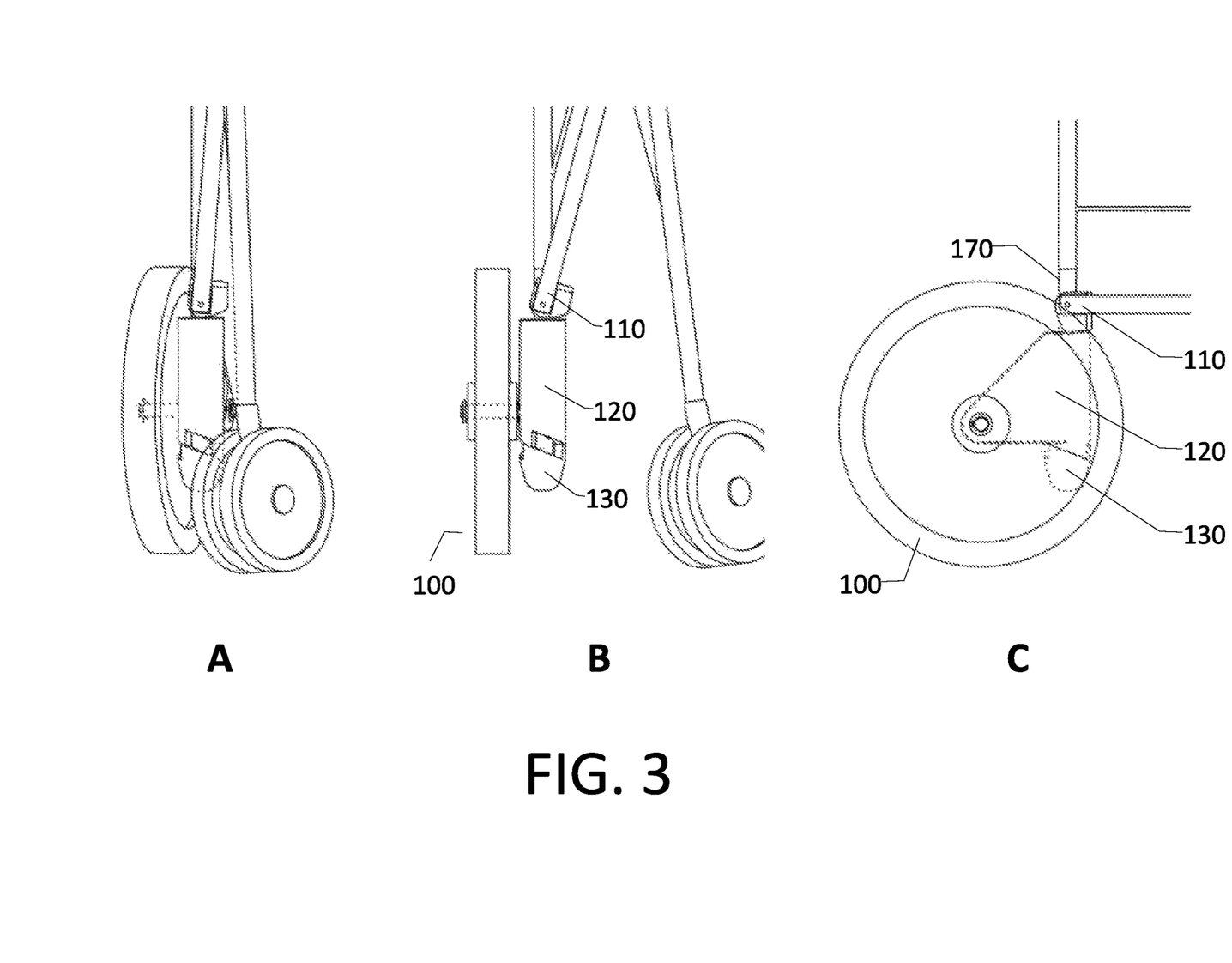
FIG. 3 Shows two dimensional parallel views of the rear or back wheels of the foldable shopping cart in: A) Folded or closed condition, B) Partially unfolded condition, and C) Fully unfolded or open condition.

Referring to FIG. 3 of the drawing, each rear wheel is mounted on a moveable or rotatable wheel-bracket (120). The cam-lever (110) controls the cam piece, whereby upon unfolding the cart, the cam-lever moves from an approximately vertical position (FIG. 3A) to an approximately horizontal position (FIG. 3C). The act of unfolding the cart causes the cam piece (FIG. 4, piece 111) to push the wheel-bracket (120) down towards the stationery non-rotating cap (130). The angular teeth located on the top of the non-rotatable cap (130) and the bottom of the rotatable wheel-bracket (120) force the wheel-bracket to rotate and deploy the wheels into usable position.

Figure 4:
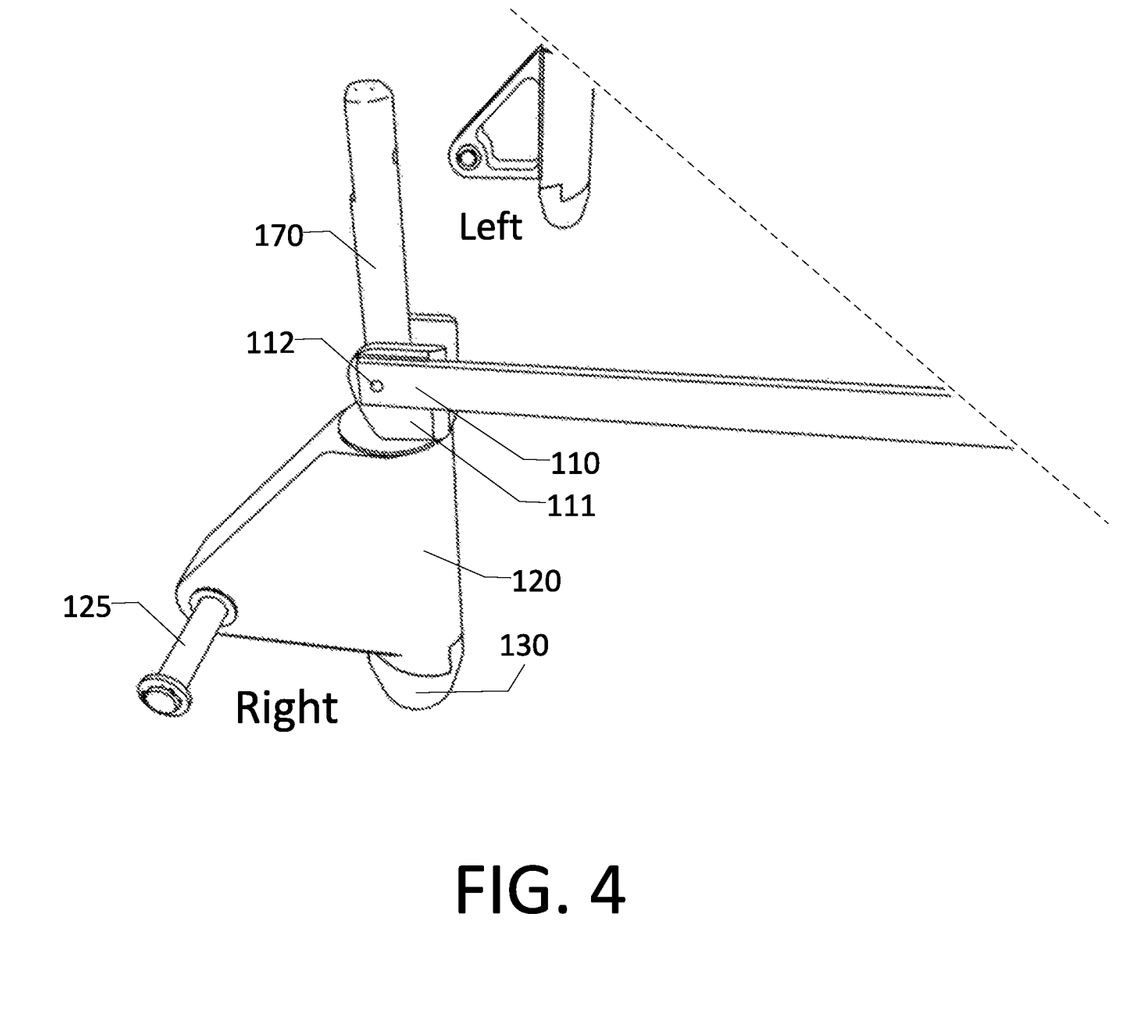
FIG. 4 Shows a perspective view illustrating rotatable right and left wheel-brackets (without the wheels) in open or unfolded condition (as shown in FIG. 2C).
Figure 5:
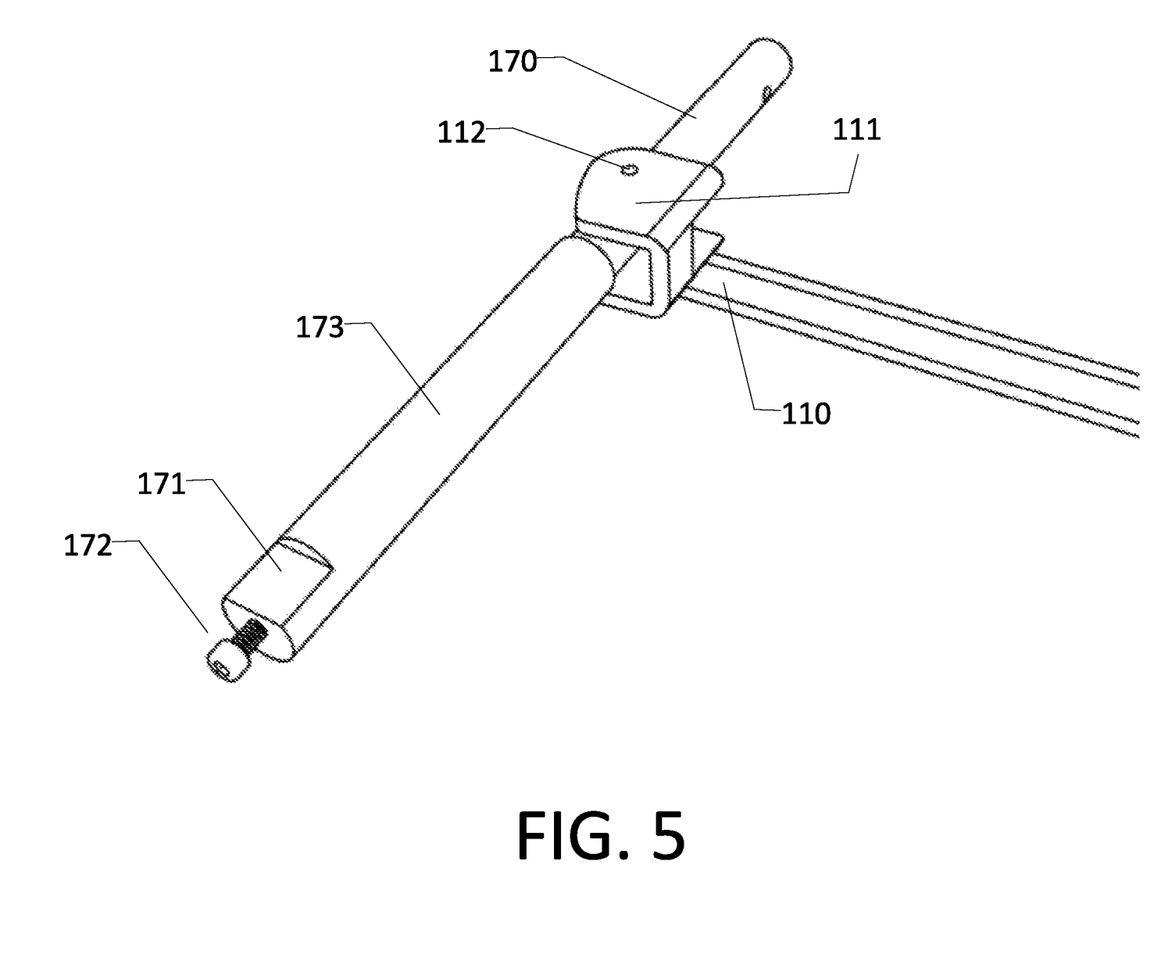
FIG. 5 Shows a perspective view illustrating a cam-lever and cam rotating or sliding piece (and inner shaft of the wheel bracket), which is in contact with the wheel bracket, and is responsible for transforming rotary motion into linear motion or vice versa.

Referring to FIG. 4 of the drawings, the rotatable, pivoting, or collapsible right and left wheel-brackets are shown when the cart is in unfolded open in-use condition. The wheel-bracket surrounds or encloses a center or inner-shaft or rod (170). This inner-shaft (FIG. 5) provides stationary support to the bottom cap (171, 172), and rotational support to the wheel-brackets (120). In the preferred embodiment, there is a spring (174) inside the wheel-bracket around the inner shaft (173), thereby providing rotational tension that automatically rotates the wheel-bracket to closed position upon folding the cart. In an alternative embodiment, the spring tension may be in the direction of wheel deployment. In such embodiments, the action of deploying the wheel is caused by spring tension, and collapsing is caused by the collapsing/folding of the cart.

Figure 6:
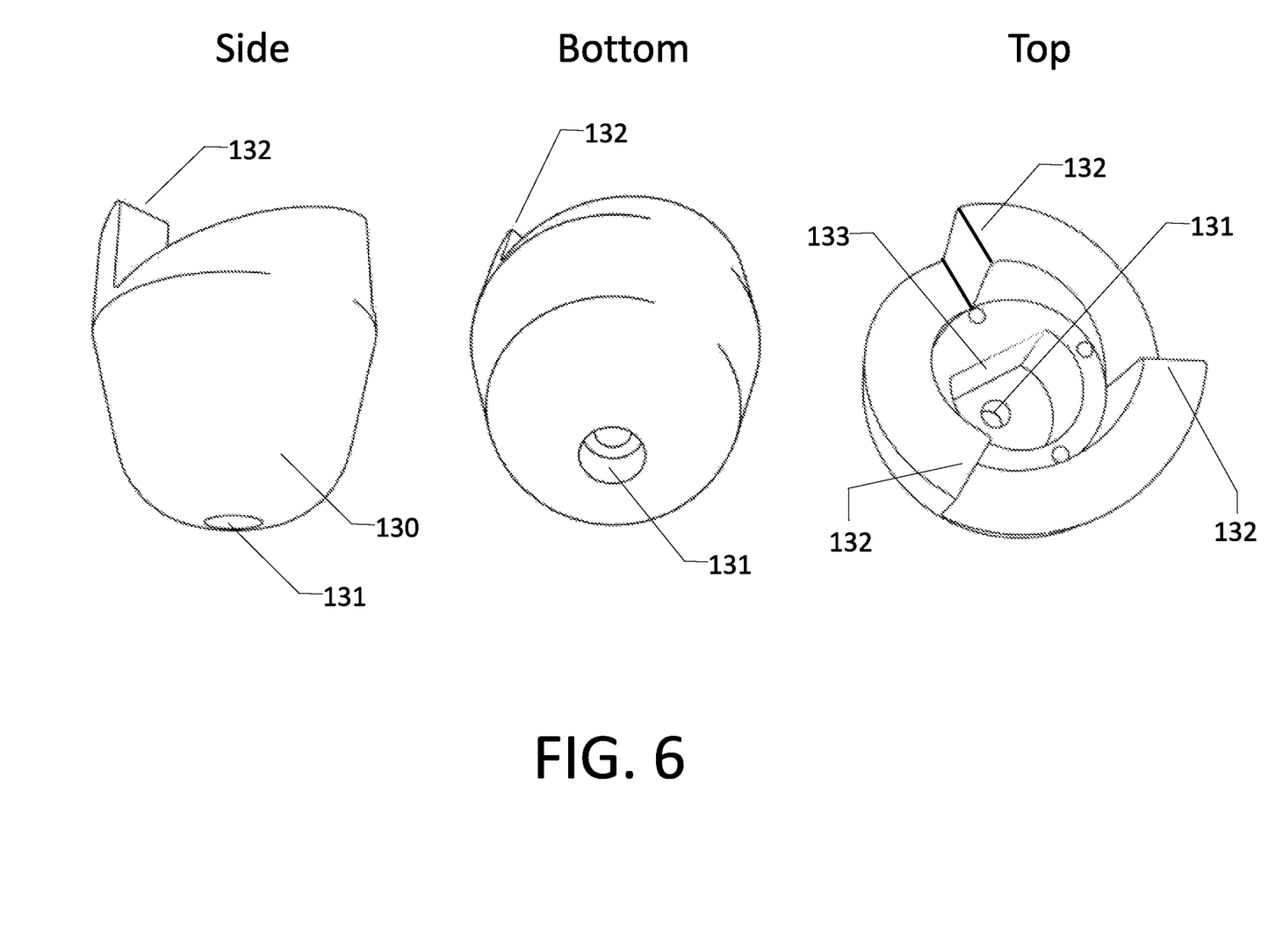
FIG. 6 Shows perspective views illustrating a stationary or non-rotatable cap or casing piece, providing rotational guide (angular teeth 132) for the automatically deploying wheel. The drawing shows Side, Bottom, and Top views of the cap or casing piece.

Referring to FIG. 6 of the drawings, the cap provides an inner surface with an indentation, such as a D-shaped indentation (133) as an example of a means to prevent rotation of the cap upon folding and unfolding the cart. This indentation mates with a matching key machined on the inner shaft (FIG. 5, 171), and prevents rotation relative to the wheel-bracket. In other embodiments, the D-shaped indentation is replaced or supplemented with one or more other shapes of "keys", pins, or methods of fixing it stably to the shaft, or the cap or fixed piece is manufactured as one piece, or glued, solvent welded, welded, or otherwise made into one stable part with the shaft or frame (16 and 17).

The jagged angular teeth of the cap (132) act as a guide for the wheel-bracket (120) movement upon being pushed down by the cam (111). In other embodiments, non-toothed mechanism may be used to guide the wheel-bracket movement or motion; such mechanism may include cam, gear, wormgear, cable, or other means.

In other embodiments, the wheel-bracket and the cap pieces may be reversed and the wheel may be connected to either the moving or rotating part.

Figure 7:
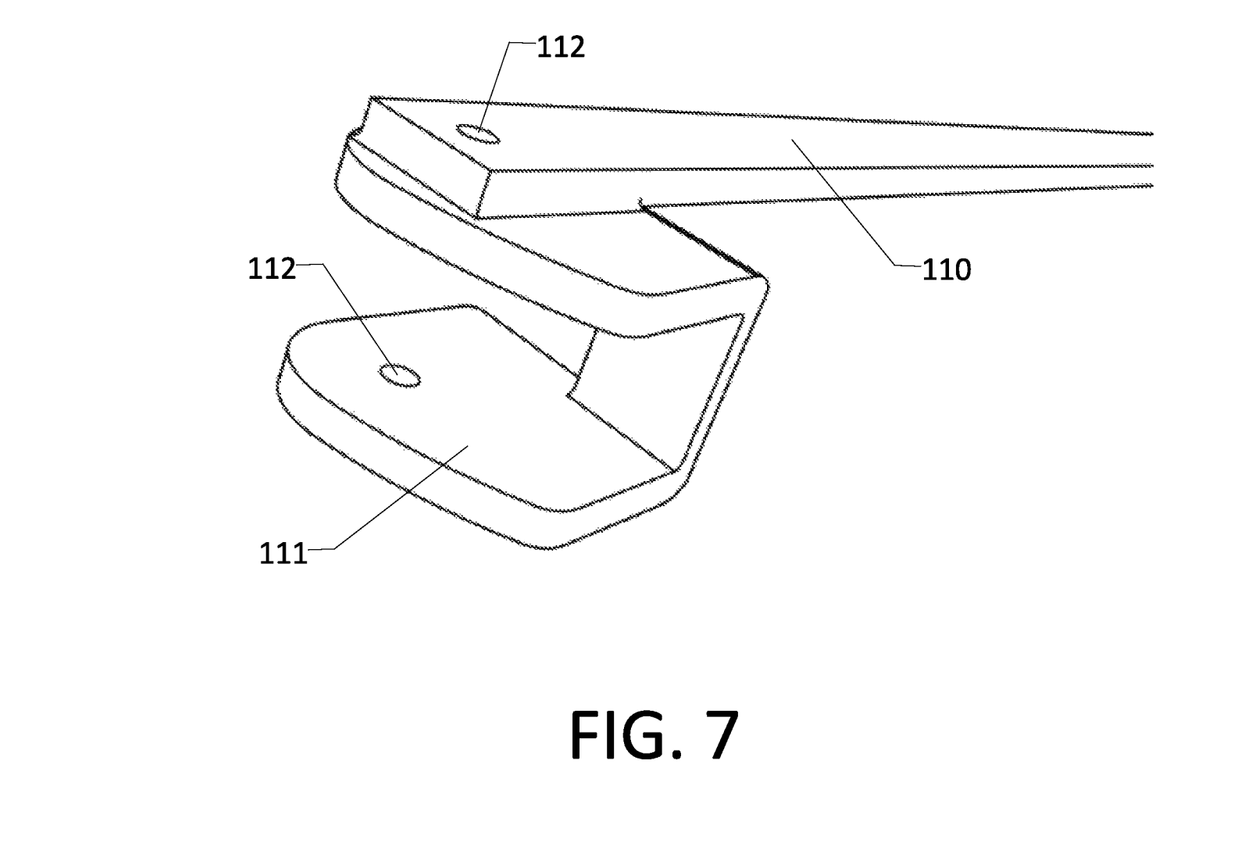
FIG. 7 is a perspective view illustrating a cam-lever and cam rotating or sliding piece (without the inner shaft of the wheel bracket), responsible for translating the folding (closing) and unfolding (opening) action of the cart to upward and downward pressure to the wheel bracket.

Referring to FIG. 7, the cam (111) and the cam-lever (110) are guided and rotate about a pin or rivet that is inserted through corresponding holes (112). This pin connects through the back side-frame of the cart (17), and provides the required support for the cam and cam-lever. The rounded angular section of the cam provides a profile necessary to convert rotational to vertical movement for positioning the wheel bracket in deployed or collapsed condition.

In an additional embodiment, the shopping cart may provide front wheel or wheels that deploy in a similar manner as described by this invention.

As additional preferred embodiments, the foldable frame may further comprise a flexible (e.g. fabric) or ridged (e.g. metal) pocket (not illustrated) provided at the rear upper arm so that the users can put their wallet, coins or other small items in the pocket (extra baskets or holding-spaces).

As an additional preferred embodiment, a latch or hook member is provided at the front, back, or side frame or ribs, which may be used to maintain the cart in open or closed position. Thus, when the front frame is folded to overlap with the rear frame, the hook member is engaged with the holding member of the frame so as a means to retain the foldable frame in the folded condition.

The movable connection between the components of the shopping cart can be achieved by rivets, screws, bolts and the like. In a preferred embodiment, the side-ribs of the cart (12) are movably connected to the front (14) and back (17) side-frames by rivets. Other connections, including the cam and the cap, may be held in place rivets, screws, bolts and the like. Non movable connections can be achieved by welding, solvent welding, adhesives, melting, compression, compression points, rivets, screws, bolts and the like.

Figure 8:
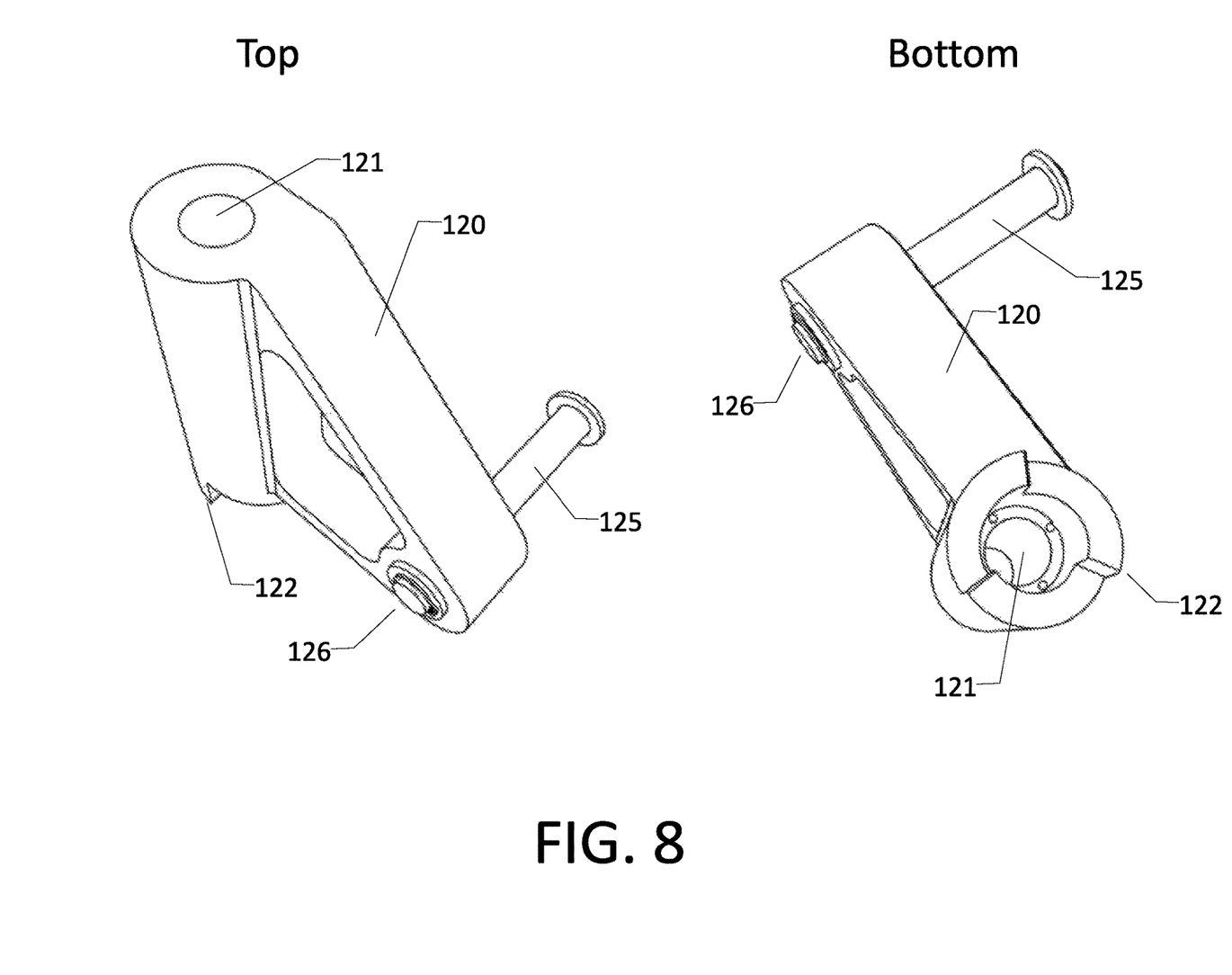
FIG. 8 Shows perspective top view and bottom view of the wheel bracket.
Figure 9:
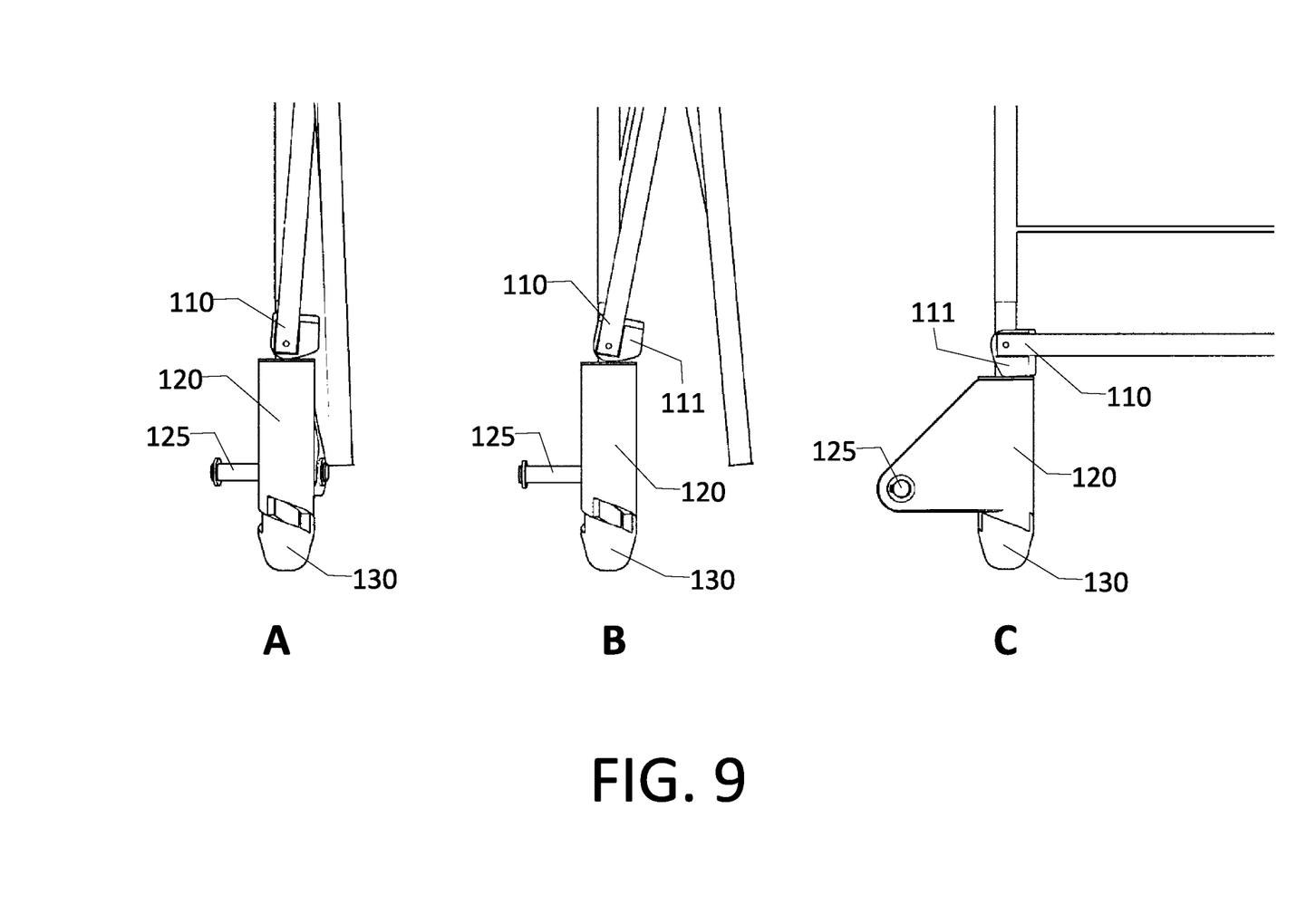
FIG. 9 Shows side or parallel view (two dimensional) of the rear or back wheel-brackets (similar to FIG. 3, but without the wheels) of the foldable cart in: A) Folded condition, B) Partially unfolded condition, and C) Unfolded condition.
Figure 10:
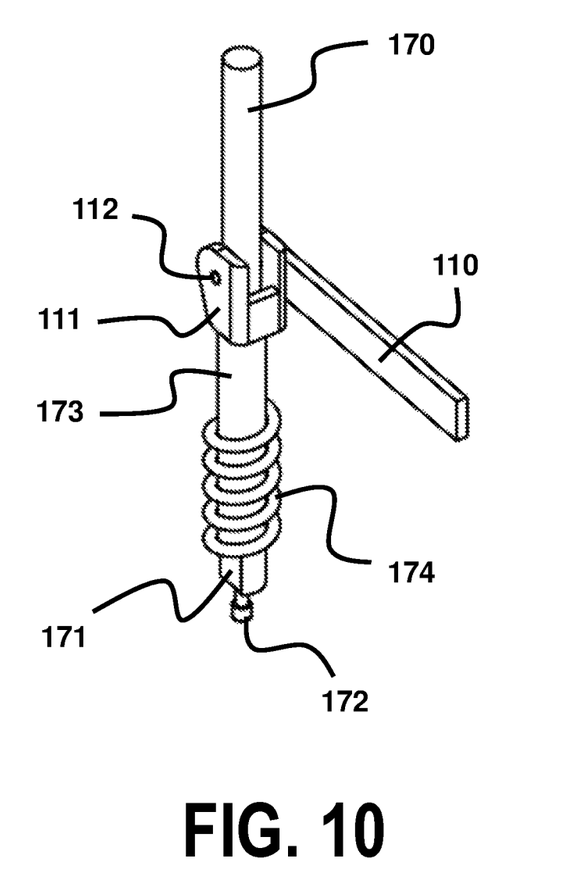
FIG. 10 shows a fragmentary view illustrating the spring for tensioning the wheel-bracket to the closed or folded condition (as shown in FIG. 2A) around the inner shaft (173).

In FIG. 8, the wheel-bracket (120) is shown by top and bottom views. The inner-shaft (173) provides support to the bracket by being inserted in the center opening of the wheel-bracket (121). The wheels are supported by the wheel connection (125, 126) or axle. The jagged angular teeth (122) cause the rotational movement of the wheel-bracket through being guided by the jagged angular teeth of the stationary non-rotational cap (FIG. 6, 132). FIG. 9 shows the details of the critical components of the invention including the cam (111), the movable wheel-bracket (120), and the stationary non moveable or non-rotating casing (130). In other embodiments, these critical components in different manners including in reverse, and do not have to be in position in the manner described herein.

One skilled in the art will understand that the embodiment of the present invention as shown in the drawings and described above is exemplary only and not intended to be limiting. Although illustrative embodiments of the present invention have been described herein, the invention is not limited to those described, and that various other changes or modifications may be made by one skilled in the art without departing from the scope or spirit of the invention. The invention has been described in some detail by way of illustration and example for purposes of clarity of understanding, thus teaching those skilled in the art that other changes or modification that is not specifically stated herein can be made. Therefore, the description and examples should not be construed as limiting the scope of the invention. Throughout the description and specification of the invention herein, unless clearly stated otherwise, words such as "comprise" or "include" or variations such as "comprises" or "comprising" or "includes" or "including", will be understood to imply the inclusion of the stated features or integers, but not the exclusion of any other feature or integer or group of features or integers. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. When referring to the cart folding and unfolding, the words "condition" or "position" are used interchangeably to imply same meaning or same concept; The words "folded", "collapsed", "compact", or "closed", "storage position", "storage condition", are used interchangeably to imply same meaning or same concept; The words "unfolded", "open", "in-use" are used interchangeably to imply same meaning or same concept.

It will thus be seen that the objects of the present invention have been fully and effectively accomplished. The embodiments have been shown and described for the purposes of illustrating the functional and structural principles of the present invention and is subject to change without departure from such principles.

The invention claimed is:

1. A foldable cart comprising:
a foldable frame that is to fold from an unfolded condition to a folded condition and is to unfold from the folded condition to the unfolded condition as the foldable cart is folded and unfolded, respectively; and
one or more wheels supported relative to the foldable frame such that unfolding the foldable cart automatically deploys at least one of the one or more wheels for rolling on a surface,
wherein a base frame supports the foldable frame and the holding-space defined by the foldable frame when the cart is in the unfolded condition.

2. The cart of claim 1, wherein the at least one of the one or more wheels is mounted on a moveable wheel-bracket comprising means for deployment of the at least one of the one or more wheels from a closed condition to an open condition in which the at least one of the one or more wheels is in an in-use condition for rolling on the surface.

3. The cart of claim 1, wherein the foldable frame comprises a back frame and wherein the at least one of the one or more wheels are provided at the back frame.

4. The cart of claim 2, wherein the wheel-bracket comprises an axle and wherein the at least one of the one or more wheels is mounted on the axle.

5. The cart of claim 1, wherein the at least one of the one or more wheels is a rear wheel.

6. A foldable cart comprising:
a holding-space defined by a foldable frame, the foldable frame comprising a back frame, wherein the foldable frame is to fold from an unfolded condition to a folded condition and is to unfold from the folded condition to the unfolded condition as the foldable cart is folded and unfolded, respectively; and
one or more wheels supported relative to the foldable frame such that at least one of the one or more wheels are movable between a closed condition and an open condition for rolling on a surface,
wherein a base frame supports the foldable frame and the holding-space when the foldable cart is in the unfolded condition,
wherein the at least one of the one or more wheels is approximately parallel to a two dimensional spatial plane of the back frame of the folded cart when the at least one of the one or more wheels is in the closed condition, and wherein the at least one of the one or more wheels is approximately perpendicular to the two dimensional plane of the back frame of the unfolded cart when the at least one of the one or more wheels is in the open condition.

7. The cart of claim 6, wherein the at least one of the one or more wheels is mounted on a moveable wheel-bracket comprising means for deployment of the at least one of the one or more wheels from the closed condition to the open condition in which the at least one of the one or more wheels is in an in-use condition for rolling on the surface.

8. The cart of claim 6, wherein the at least one of the one or more wheels is provided at the back frame.

9. The cart of claim 7, wherein the wheel-bracket comprises an axle and wherein the at least one of the one or more wheels is mounted on the axle.

10. The cart of claim 6, wherein the at least one of the one or more wheels is a rear wheel.

11. The cart of claim 6, wherein the at least one of the one or more wheels is provided at the back frame.

12. The cart of claim 11, wherein the at least one of the one or more wheels is mounted on a moveable wheel-bracket comprising means for deployment of the at least one of the one or more wheels from the closed condition to the open condition in which the at least one of the one or more wheels is in an in-use condition for rolling on the surface.

13. The cart of claim 12, wherein the means for deployment of the at least one of the one or more wheels comprises angular teeth located on the bottom of the wheel-bracket, the cart further comprising:
a cam lever supported on the foldable frame for movement upon folding and unfolding the cart;
a cam piece controlled by the cam lever; and
a cap having angular teeth, the cap being non-rotatable relative to the two-dimensional plane of the back frame,
wherein unfolding the cart causes the cam piece to push the wheel-bracket towards the cap, and wherein the angular teeth located on the cap and the angular teeth located on the wheel-bracket force the wheel-bracket to rotate and deploy the at least one of the one or more wheels into the open condition such that the at least one of the one or more wheels is in a usable position.

14. The cart of claim 12, wherein the wheel-bracket comprises an axle and wherein the at least one of the one or more wheels is mounted on the axle.

15. The cart of claim 11, wherein the at least one of the one or more wheels is a rear wheel.

16. The cart of claim 12, further comprising a spring located inside the wheel-bracket, wherein the spring provides rotational tension that automatically rotates the wheel-bracket in order to move the at least one of the one or more wheels to the closed condition upon folding the cart.

17. The cart of claim 13, wherein the wheel-bracket surrounds an inner shaft, and wherein the inner shaft provides stationary support to the cap.

18. The cart of claim 12, wherein the action of folding the cart automatically rotates the wheel-bracket to move the at least one of one or more wheels closer to the folded cart in one or more spatial dimensions.

19. The cart of claim 12, wherein unfolding the cart automatically rotates and lowers the at least one of the one or more wheels to the open condition.

20. The cart of claim 12, wherein folding the cart automatically rotates and lifts upward the at least one of the one or more wheels to the closed condition.

* * * * *